Jan. 31, 1950     G. H. BUSHWAY     2,496,199
ELECTRICAL HEAT TREATING MECHANISM
Filed Nov. 22, 1947
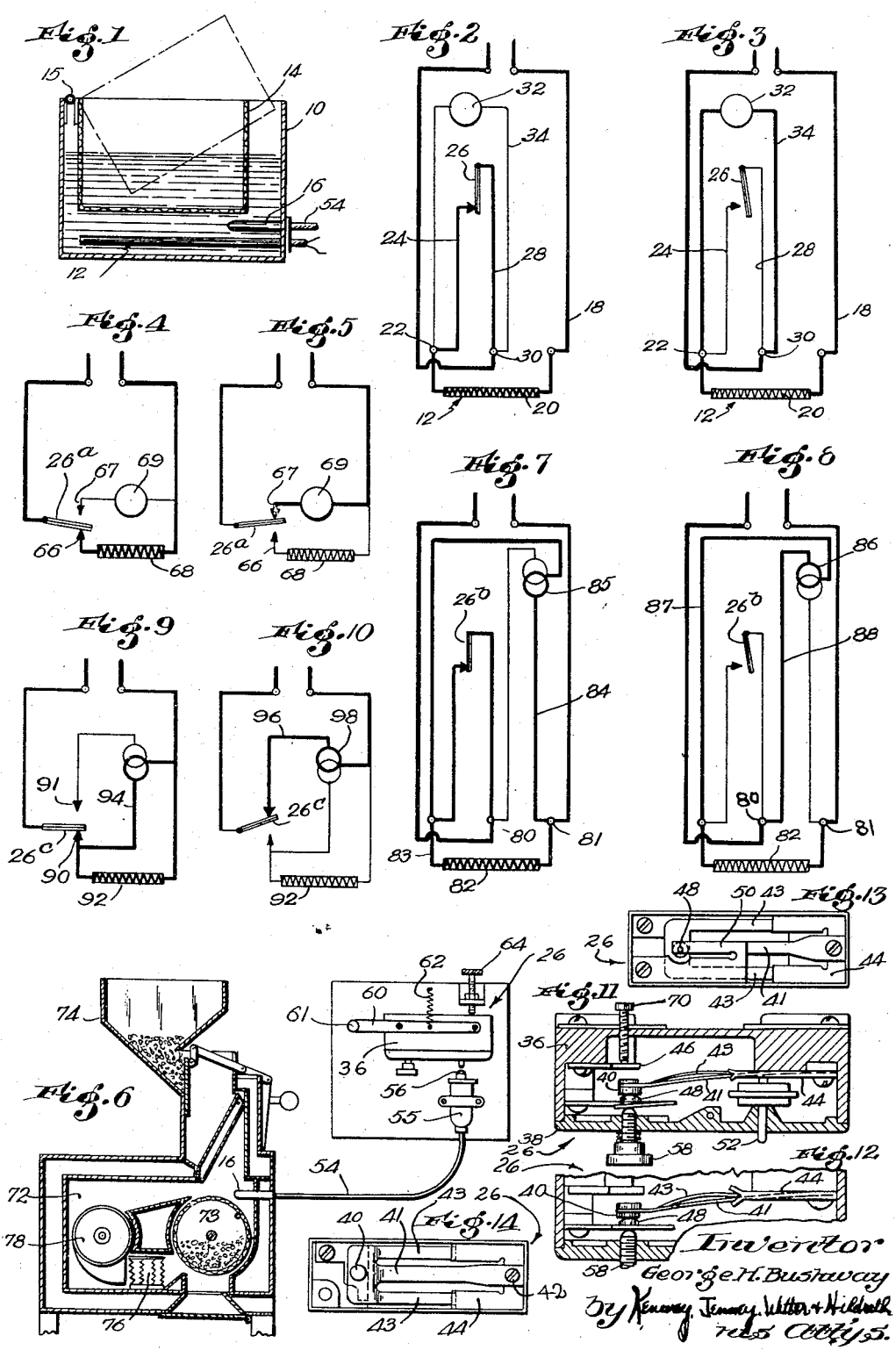

Patented Jan. 31, 1950

2,496,199

UNITED STATES PATENT OFFICE 2,496,199

ELECTRICAL HEAT-TREATING MECHANISM

George H. Bushway, North Hampton, N. H., assignor to Electricooker, Inc., Newburyport, Mass., a corporation of Massachusetts Application November 22, 1947, Serial No. 787,519

3 Claims. (Cl. 219—19)

This invention relates to electrical heat treating mechanism and more especially to new and improved means for cooking continuously and to predetermined degree successive batches of edibles. The cooking can be preformed by submerging the product in an electrically heated liquid bath, as described in Reissue Patent No. 20,570, or by subjecting the product to a roasting treatment in a closed chamber wherein a gaseous medium is electrically heated and circulated through the product, as disclosed in United States application Serial No. 700,116, filed September 28, 1946. In either case the mechanism employed is fully automatic and includes an electric motor for handling the product, a heating coil for heating the cooking medium and an electric circuit together with a thermostat and other automatic means for controlling the operation of the motor and heating coil through a predetermined cycle. The primary object of my invention herein consists in an improved and simplified mechanism for automatically controlling this cycle of operations.

The cycle of operations in both mechanisms above described for wet and dry cooking includes a predetermined cooking period, discharging of the cooked bath at the end of such period, depositing into the cooker of a new batch to be cooked, and the starting of the cooking operation. These operations are all automatic and heretofore have required the employment of mechanically operated switches of an expensive and complex nature for properly timing and effecting the various functions. I have discovered a new and improved electric circuit including a simple and inexpensive adjustable snap switch which will perform these controlling functions efficiently and effectively and eliminate the complex and expensive mechanism heretofore required. The production of an improved and simplified mechanism of this nature for the purpose described comprises a further object of the invention.

These and other features of the invention will be best understood and appreciated from the following description of preferred embodiments thereof selected for purposes of illustration and shown in the accompanying drawings in which—

Fig. 1 is a fragmentary view of an apparatus for cooking edibles in a liquid bath, Fig. 2 is a diagram of an electrical circuit and cooperating mechanism for operating this cooking apparatus, Fig. 3 is a like view with the controlling switch open, Fig. 4 is a diagrammatic view of a modified electrical circuit for performing the same function, Fig. 5 is a like view with the controlling switch in another position, Fig. 6 is a fragmentary view of apparatus for cooking edibles in a gaseous medium in a closed chamber, Fig. 7 is a diagram of an electrical circuit and cooperating mechanism for operating the cooking apparatus of Fig. 6, Fig. 8 is a like view with the controlling switch open, Fig. 9 is a diagrammatic view of a modified circuit for performing the same functions, Fig. 10 is a like view with the controlling switch in another position, Fig. 11 is a longitudinal sectional view through a snap switch employed in the circuit, Fig. 12 is a like fragmentary view with a contact adjusted to a different position, Fig. 13 is a plan view of the snap switch with the cover removed, and Fig. 14 is a like view with a contact element removed.

The invention relates to machines for heat treating or cooking various products, particularly edibles, and more especially concerns a novel and extremely simple and economical electrical circuit and cooperating mechanism for automatically controlling such machines. The cooking can be performed in a liquid bath heated to predetermined temperature, as in said Reissue Patent 20,570, or in a gaseous medium heated to a predetermined temperature and circulating through the product in a closed chamber, as in said application Serial No. 700,116. In either case the mechanism is adapted automatically to function repeatedly through a predetermined cycle and treat successive batches of a product, the cycle including the placing of a predetermined bath of the product in the cooking compartment, subjecting the batch to a predetermined cooking treatment and finally discharging the cooked batch.

In Fig. 1 of the drawing, 10 indicates a container for holding a liquid cooking bath and 12 indicates an electrically operated element for heating the bath. The product to be cooked is most commonly in mass form requiring a basket 14 or the like for holding batches of the product during the treatment. The basket is hinged to the container at 15 whereby it can be pivotally elevated to discharging position. A thermostat for controlling the cooking temperature of the bath is indicated at 16.

As in Reissue Patent 20,570 the product is cooked in the bath until the batch reaches a predetermined high temperature. The thermostat is set to open the heating circuit at this temperature and close the circuit to the motor which thereupon raises the basket and discharges the cooked product. Following the discharging operation the continued operation of the motor lowers the empty basket into the bath and a new batch to be cooked is then deposited into the basket. This cold batch reduces the temperature of the bath and the thermostat thereupon automatically opens the motor circuit and closes the heating circuit, whereupon the cycle is repeated.

In Figs. 2 and 3 of the drawing I have illustrated a simplified electric circuit adapted automatically to control this cycle of operations. One lead 18 of the circuit extends through a coil 20 of the heating unit 12 and from the coil to a terminal post 22. From the post 22 a lead 24 extends to a switch 26 and from thence a lead 28 extends to a terminal post 30. When the switch is closed a direct heating circuit is established through the coil 20. A motor 32 is provided for operating the basket 14 and a shunt circuit 34 is provided through the motor from the terminal posts 22 and 30. When the switch 26 is open (Fig. 3) a circuit is established through the motor and closing of the switch short circuits the motor and establishes the direct heating circuit through the coil 20 (Fig. 2). It will be apparent that the heating coil is activated, independently of the motor, when the switch is closed.

The switch 26 is a snap switch of the nature shown in Figs. 6 and 11–14 and comprises a body 36 and a cover 38. The movable contact 40 is carried on the free end of a spring arm 41 anchored at 42 and having two bowed legs 43 held beneath a U-plate 44 for effecting the snap action. The contact 40 operates between two stops 46 and 48, the stop 48 comprising a contact carried on the free end of a U-shaped spring arm 50. A pin 52 slidably carried in the cover 38 is positioned to engage the arm 41 and move the contact 40 from its normal engagement with the contact 48 to an intermediate position from which it snaps into contact with the stop 46.

The thermostat 16 comprises a bulb having a tube 54 leading to a bellows 55 provided with an anvil 56 for engaging the pin 52. Expansion of the liquid in the bulb is adapted to expand the bellows and anvil into contact with the pin and thereby move the arm 41 to and beyond the intermediate position from which its contact 40 snaps into engagement with the stop 46. The arm and contact 40 return to the normal position upon a predetermined retracting of pressure from the pin 52 due to cooling of the bath.

In Reissue Patent 20,570, a mechanical switch is employed for opening the motor circuit when the basket has been returned to the cooking bath following the discharging of a cooked batch. I have discovered that the snap switch 26 of this application can be so accurately and sensitively adjusted as automatically to perform this function, thereby eliminating the necessity for the mechanical switch heretofore employed. As indicated in Figs. 11 and 12 herein the contact 48 is backed up by an adjusting screw 58 whereby the arms 50 and 41 together with their contacts can be adjusted toward the intermediate position from which the arm 41 snaps into contact with the stop 46. This adjustment places the arm 41 under stress in the direction of the intermediate position and somewhat straightens the bowed legs 43, thereby weakening the snap action of the arm 41 and causing it to return from the stop 46 more quickly and at a relatively diminished temperature drop in the cooking bath. As shown in Fig. 7 of Reissue Patent 20,570, the shaft 58 therein has an idle travel of approximately 90° after the basket is returned to the bath and I have found that the arm 41 herein can be adjusted to a position at which it automatically returns from the stop 46 well within this range.

The operation of the circuit shown in Figs. 2 and 3 will now be apparent. Before depositing the first batch to be cooked into the basket the bath is brought up to a temperature at which the thermostat opens the switch 26. The batch is then deposited into the basket and bath. The switch 26 immediately closes (Fig. 2), due to the cooling of the bath, and the cooking continues until the bath again reaches the predetermined temperature at which the thermostat is set to open the switch, this period being sufficient to effect the desired cooking. The switch is thereupon opened (Fig. 3), thus cutting the motor into the circuit and discontinuing the direct heating circuit through the coil 20. The motor herein thereupon operates to raise the basket herein and discharge the cooked product, as illustrated in Reissue Patent 20,570, and return the basket to the bath. It will be understood that the screw 58 has been adjusted to a position at which the contact arm 41 will return from the stop 46 after the basket is returned to the bath and within the idle range above described. In a fully automatic machine of the nature shown in Reissue Patent 20,570 a new batch is immediately deposited into the basket and the cooking again immediately starts with the returning of the switch contact 40 herein to the contact 48 herein. The cooking cycle is then repeated.

The switch 36 is supported on a yoke 60 pivoted at 61 and normally held by a spring 62 in contact with a stop screw 64. Rotation of the screw is adapted to adjust the switch toward and from the anvil 56 and the predetermined temperature at which each switch is automatically opened is determined by the adjustment of this screw.

In Figs. 4 and 5 I have illustrated a modified circuit for performing the same function. In this case the switch 26ª cooperates with two contacts 66 and 67 and is normally in engagement with the contact 66 to the heating coil 68 (Fig. 4). The contact 67 is disposed on the stop 46 (Fig. 11) and provides a circuit through the motor 69 when in the position of Fig. 5, as will be apparent.

While I prefer to mount the adjusting screw 58 in position to operate through the contacts 48 and 40 to flex the arm 41, it will be understood that any convenient mounting of the screw to effect the required flexing of the arm a predetermined amount toward its intermediate position for the purpose described is within the scope of the invention. It may also be possible to accomplish the same object by adjusting the stop 46 toward the contact 40, as by a screw 70, and predetermined setting of the switch by such means is also within the scope of the invention.

In Fig. 6 I have briefly illustrated the cooking apparatus shown and described more specifically in said application Serial No. 700,116. This apparatus comprises a cooking chamber 72 within which is a rotary basket 73 for the product to be cooked. Predetermined batches of the product are deposited in the basket from a hopper 74. The gaseous medium in the chamber is heated electrically at 76 and is circulated through the heater and basket by a blower 78. The basket is rotated in the forward direction during cooking and when the basket rotation is reversed the product is automatically discharged. The basket is driven by the reversible motor indicated in Figs. 7-10.

The circuit shown in Figs. 7 and 8 includes two main terminal posts 80 and 81. The heating coil 82 is disposed in a lead 83 extending from the post 81 through the coil and switch 26<sup>b</sup> to the post 80, thus energizing the heating coil when the switch is closed. A circuit 84 also extends from the post 81 through the forward winding 85 of the motor and back through the switch to the post 80, thus operating the motor forwardly when the switch is closed (Fig. 7). Thus it will be apparent that both the heating coil and forward circuit of the motor are activated when the switch is closed. When the switch is opened (Fig. 8) a circuit extends through the reverse winding 86 of the motor, including post 81, coil 82, lead 87 to the motor and lead 88 to the post 80. Thus the direct heating circuit through the coil is discontinued and the motor is operated reversely when the switch is open. The snap switch is set to re-close the switch 26<sup>b</sup> following the discharging of product from the basket, whereafter a new batch is automatically deposited into the basket and the cycle repeated.

In Figs. 9 and 10 is illustrated a modified circuit for performing the same function. The switch 26<sup>c</sup> cooperates with two contacts 90 and 91 and is normally in engagement with the contact 90 (Fig. 9). In this position the heating coil 92 is energized and the motor is rotated forwardly through the lead 94. When the switch is open the heating coil circuit is broken and a circuit 96 is established through the reverse winding 98 of the motor.

Having thus disclosed my invention, what I claim as new and desire to secure by Letters Patent is:

1. Heat treating mechanism comprising a treating chamber, an electric heating unit for heating the chamber, means in the chamber adapted to hold a product to be treated, means including a motor for causing relative movement between the product and the first mentioned means, a main electric circuit including a circuit through the motor in one part thereof and a heating circuit through the heating unit in another part, a snap switch having a spring arm carrying a contact in the main circuit and movable to and between two limit stop positions in one of which said contact closes the heating circuit through the unit and leaves said motor circuit inoperative and in the other of which the heating circuit is rendered inoperative and the motor circuit rendered operative, said arm and contact being normally in said one stop position, means associated with the chamber and operated thermostatically from the heat of the unit for moving the arm and contact from said one stop position to and beyond an intermediate position from which they snap automatically to said other stop position, the arm and contact being adapted automatically to return to said one stop position, when the temperature of heat received by the last named means from the unit has dropped a predetermined amount, and means operative on the arm for adjusting it toward said intermediate position and thereby diminishing the amount of said temperature drop required to return the arm and contact from said other stop position to said one stop position.

2. Heat treating mechanism comprising a treating chamber, an electric heating unit for heating the chamber, a rotatably mounted member in the chamber for holding a product to be treated, means including a motor for reversibly rotating said member, a main electric circuit including two motor circuits in one part thereof and a heating circuit through the heating unit in another part, a snap switch having a contact movable to and between two limit stops and adapted in one stop position to close the heating circuit through said unit and render one of said motor circuits operative and the other inoperative and in the other stop position to discontinue the heating circuit through the unit and render said one motor circuit inoperative and the other operative, said switch being normally in said one stop position, means associated with the chamber and operated thermostatically from heat of the unit for moving the switch from said one stop position to and beyond an intermediate position from which it automatically snaps to said other stop position, the switch being adapted automatically to return to said one stop position when the temperature of heat received by said means from the unit has dropped a predetermined amount, and an adjustable element carried by the switch and operative on one of said stops for adjusting it toward said intermediate position and thereby diminishing the amount of said temperature drop required to return the switch from said other stop position to said one stop position.

3. The heat treating mechanism defined in claim 2 in which said heating unit is common to the heating circuit and said other motor circuit and in which the switch in said one position shorts out said other motor circuit.

GEORGE H. BUSHWAY.

REFERENCES CITED

The following references are of record in the file of this patent:

UNITED STATES PATENTS

| Number | Name | Date |
|---|---|---|
| Re. 20,570 | Bushway | Dec. 7, 1937 |
| 994,717 | Bullis | June 13, 1911 |
| 1,398,114 | Prell | Nov. 22, 1921 |
| 1,812,016 | Nieloud | June 30, 1931 |
| 2,172,603 | Adams et al. | Sept. 12, 1939 |
| 2,188,969 | Waldvogel | Feb. 6, 1940 |
| 2,319,830 | Sampsel | May 25, 1943 |
| 2,389,577 | O'Toole et al. | Nov. 20, 1945 |
| 2,436,909 | Werner | Mar. 2, 1948 |
| 2,446,307 | Shaw | Aug. 3, 1948 |